(12) United States Patent
Woods et al.

(10) Patent No.: US 6,451,948 B1
(45) Date of Patent: *Sep. 17, 2002

(54) RADICAL-CURABLE ADHESIVE COMPOSITIONS, REACTION PRODUCTS OF WHICH DEMONSTRATE SUPERIOR RESISTANCE TO THERMAL DEGRADATION

(75) Inventors: John G. Woods, Farmington; Susanne D. Morrill, West Hartford; Anthony F. Jacobine, Meriden, all of CT (US)

(73) Assignee: Loctite Corporation, Rocky Hill, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,050

(22) Filed: Aug. 19, 1999

(51) Int. Cl.[7] .......................... C08F 12/24; C08F 12/32
(52) U.S. Cl. .................. 526/313; 526/312; 526/319; 526/320; 526/323.1; 526/329.6; 525/259; 525/263; 525/264; 524/81; 524/358; 524/315; 524/365
(58) Field of Search ................. 526/313, 320, 526/329.6, 323.1, 312, 319; 524/358, 81, 315, 365; 525/259, 263, 264

(56) References Cited

U.S. PATENT DOCUMENTS

| | | | |
|---|---|---|---|
| 3,218,305 A | 11/1965 | Krieble | 260/89.5 |
| 3,925,322 A * | 12/1975 | Azuma et al. | 260/78.4 |
| 3,988,299 A | 10/1976 | Malofsky | 260/47 |
| 4,049,750 A | 9/1977 | Brenner | 260/864 |
| 4,107,109 A | 8/1978 | Kassal | 260/4 R |
| 4,180,640 A | 12/1979 | Melody | 526/323.1 |
| 4,209,604 A | 6/1980 | Werber | 526/270 |
| 4,216,134 A | 8/1980 | Brenner | 260/40 R |
| 4,273,851 A | 6/1981 | Muzyczko | 430/175 |
| 4,281,152 A * | 7/1981 | Heummer et al. | 560/52 |
| 4,287,330 A | 9/1981 | Rich | 526/270 |
| 4,321,349 A | 3/1982 | Rich | 526/270 |
| 4,384,101 A | 5/1983 | Kovacs | 528/73 |
| 4,387,204 A | 6/1983 | Zahir et al. | 526/249 |
| 4,439,600 A | 3/1984 | Moran, Jr. | 528/392 |
| 4,468,524 A | 8/1984 | Zahir et al. | 560/221 |
| 4,524,176 A | 6/1985 | Pike | 525/12 |
| 4,533,446 A * | 8/1985 | Conway et al. | 204/159.24 |
| 4,540,829 A | 9/1985 | Hefner, Jr. | 568/634 |
| 4,543,397 A * | 9/1985 | Woods et al. | 525/455 |
| 4,546,155 A | 10/1985 | Hirose | 525/504 |
| 4,578,315 A | 3/1986 | Santorelli | 428/414 |
| 4,600,738 A | 7/1986 | Lamm | 523/500 |
| 4,624,725 A | 11/1986 | Lamm | 156/310 |
| 5,019,629 A * | 5/1991 | Woods et al. | 525/312 |
| 5,023,107 A | 6/1991 | Roberts | 427/2 |
| 5,084,490 A | 1/1992 | McArdle et al. | 522/181 |
| 5,166,290 A | 11/1992 | Hayashi et al. | 525/502 |
| 5,179,172 A | 1/1993 | Chan | 525/328.9 |
| 5,270,362 A | 12/1993 | Palmer | 524/81 |
| 5,326,827 A | 7/1994 | Aoki | 525/337 |
| 5,369,200 A | 11/1994 | Schädeli et al. | 526/262 |
| 5,395,566 A | 3/1995 | Kobayakawa | 252/586 |
| 5,468,886 A | 11/1995 | Steinmann | 549/549 |
| 5,495,051 A | 2/1996 | Wang et al. | 568/633 |
| 5,599,651 A | 2/1997 | Steinmann | 430/280.1 |
| 5,618,857 A | 4/1997 | Newberth, III | 523/176 |
| 5,630,978 A | 5/1997 | Domb | 264/330 |
| 5,656,703 A | 8/1997 | Costin | 525/531 |
| 5,730,828 A * | 3/1998 | Somemiya et al. | 156/273.3 |
| 5,863,989 A * | 1/1999 | Taguchi et al. | 525/245 |
| 6,231,714 B1 * | 5/2001 | Woods et al. | 156/275.7 |

OTHER PUBLICATIONS

R.D. Rich, "Anaerobic Adhesives" in *Handbook of Adhesive Technolgies*, 29, 467–79, A. Pizzi & K.L. Mittal, eds., Marcel Dekker, Inc. N.Y. (1994).

J.G. Woods, "Radiation Curable Adhesives" in *Radiation Curing: Science and Technology*, 333–98, S.P. Pappas, ed. Plenum Press, N.Y. (1992).

L.J. Baccei and B.M. Malofsky, "Anaerobic Adhesives Containing Maleimides Having Improved Thermal Resistance" in *Adhesive Chemistry*, 589–601, L–H, Lee, ed., Plenum Publishing Corp. (1984).

J. Woods et al., "Alkenyloxy Styrene Monomers for High–Temperature Adhesives and Sealants" in *Photopolymerization*, ch.9, pp 107–20 (1997).

* cited by examiner

*Primary Examiner*—David W. Wu
*Assistant Examiner*—Tatyana Zalukaena
(74) *Attorney, Agent, or Firm*—Steven C. Bauman

(57) ABSTRACT

The present invention is directed to radical-curable adhesive compositions which include a (meth)acrylate component; a thermal resistance-conferring component; and a radical cure-inducing composition. Reaction products of the compositions of this invention exhibit superior resistance of thermal degradation.

17 Claims, 2 Drawing Sheets

US 6,451,948 B1

RADICAL-CURABLE ADHESIVE COMPOSITIONS, REACTION PRODUCTS OF WHICH DEMONSTRATE SUPERIOR RESISTANCE TO THERMAL DEGRADATION

BACKGROUND OF THE INVENTION

1. Field of the Invention

The present invention is directed to radical-curable adhesive compositions which include a (meth)acrylate component; a thermal resistance-conferring component; and a radical cure-inducing composition. Reaction products of the compositions of this invention exhibit superior resistance to thermal degradation.

2. Brief Description of Related Technology

Radical-curable adhesive compositions generally are well-known. In the context of anaerobic adhesives, see e.g., R. D. Rich, "Anaerobic Adhesives" in *Handbook of Adhesive Technology*, 29, 467–79, A. Pizzi and K. L. Mittal, eds., Marcel Dekker, Inc., New York (1994) and references cited therein. In the context of radiation-curable adhesives, see e.g., J. G. Woods, "Radiation Curable Adhesives" in *Radiation Curing: Science and Technology*, 333–98, S. P. Pappas, ed., Plenum Press, New York (1992).

Uses of radical-curable adhesives are legion and new applications continue to be developed.

In the past, many adhesives particularly anaerobic adhesives, have been rendered resistant to degradation at elevated temperatures by the inclusion of certain additives.

For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in *Adhesive Chemicals*, 589–601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

U.S. Pat. No. 4,216,134 (Brenner) speaks to one-component anaerobic adhesive compositions which include ethylenically unsaturated diluent monomers (such as styrene, divinylbenzene, diallyl carbonates, diallyl maleate, diallyl phthalate, diallyl isophthalate and the like), prepolymers (such as 1,2-polybutadienes and copolymers thereof, isophthalic polymers, bisphenol A fumates, epoxy resins, polyallylvinyl ethers and the like) and triallyl cyanurate or triallyl isocyanurate as reaction components. The '134 patent is at least a three component composition (in addition to its cure components) and requires a prepolymer which may be included in addition to or as a replacement for the ethylenically unsaturated diluent monomer. Examples of the prepolymer are given as "high vinyl 1,2-polybutadienes and copolymers thereof especially styrene; isophthalic polymers; bisphenol A fumates and other alkyls; epoxy resins; polyalkyl vinylethers and related polymers; alkylic resins based on polyfunctional ethers and esters and mixtures of two or more of these prepolymers." (Col. 5, lines 32–39.)

While the addition to radical-curable adhesive compositions of such maleimide compounds to render them resistant to thermal degradation provides reaction products with acceptable performance, it would be desirable to find alternative compounds to include in such formulations. Moreover, in certain adhesive compositions, maleimides (which tend to be, insoluble) often function to reduce radiation penetration thereby inhibiting photoinitated cure of acrylate-based compositions.

U.S. Pat. No. 4,540,829 (Heffner) speaks to alkylated di and polycyclopentadiene diphenols.

U.S. Pat. No. 5,495,051 (Wang) speaks to certain phenol alkyl ethers, their preparation and cure together with bis-maleimides.

U.S. Pat. No. 5,166,290 (Hayashi) describes a resin composition for composites that requires a bismaleimide mixture with certain allyl phenyl ethers.

U.S. Pat. No. 5,084,490 (McArdle) and U.S. Pat. No. 5,141,970 (McArdle) describe polyfunctional cationically polymerizable styryloxy compounds, curable compositions including such styryloxy compounds and methods of forming high-temperature resistant polymers therefrom. These compounds may be described in more detail with reference to structure I:

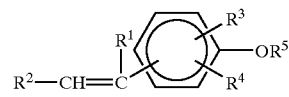

I where $R^1$ and $R^2$ are H, or one of $R^1$ and $R^2$ is H and the other is alkyl; $R^3$ and $R^4$ (which may be the same or different) are H, $C_{1-5}$ alkyl or $C_{1-5}$ alkenyl; or one of $R^3$ and $R^4$ may be —$OR^5$ or $C_{1-5}$ alkoxy or $C_{1-5}$ alkenyloxy, if $R^2$ is not methyl; and $R^5$ is selected from

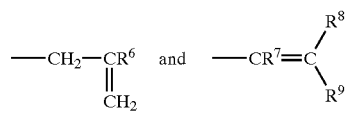

where $R^6$ is $C_{1-5}$ alkyl, and $R^7$, $R^8$ and $R^9$ may be the same or different and are H or $C_{1-5}$ alkyl.

These cationically curable propenyloxystyrene compounds possess outstanding thermal and mechanical properties in their cured state. To reach the cured state, the compounds undergo a 2-stage curing process involving an initial acid catalyzed addition polymerization or copolymerization of the styrene group (called A-stage polymerization), followed by a heat-triggered, post-curing reaction of the propenyloxyphenyl group (called B-stage polymerization). During the post-curing reaction, the A-stage polymer rearranges to form a reactive phenolic polymer, which spontaneously reacts with the propenyloxy group through an electrophilic substitution reaction. This results in the formation of a cross-linked polymer that exhibits a high decomposition temperature ("$T_d$") [$T_d$>400° C., as measured by thermal gravimetric analysis ("TGA")], a high glass transition ("$T_g$") [$T_g$>300° C., as measured by dynamic mechanical analysis ("DMA")] and good adhesion. See also J. Woods et al., "Alkenyloxy Styrene Monomers for High-Temperature Adhesives and Sealants" in *Photopolymerization*, ch. 9, pp. 107–20 (1997).

While this information describes styryloxy and propenyloxystyrene compounds and suggests their usefulness as adhesives, sealants and/or coatings and/or in compositions destined for such use, their use to confer resistance to thermal degradation on such compositions, particularly (meth)acrylate-containing radical-curable adhesive compositions, remained unknown until the discovery of the invention described herein.

U.S. Pat. No. 5,369,200 (Schadeli) describes terpolymers of two different maleimide monomers and an olefinically unsaturated phenyl ether monomer in which the phenyl ether is defined by an acid cleavable group —OR$_2$ linked to a phenyl ring. Examples of such monomers are given as a terpolymer of 4-(2-tetrahydropyranyloxy) benzyl methacrylate, N-hydroxymethylmaleimide and N-(acetoxymethyl)maleimide. The terpolymers are used as positive resists with acid generating photocatalysts and therefore it is imperative that the OR$_2$ group be selected to be acid cleavable.

U.S. Pat. No. 4,387,204 (Zahir) and U.S. Pat. No. 4,468,524 (Zahir) describe alkenylphenyl substituted acrylates or methacrylates and cross-linkable compositions thereof.

Notwithstanding the state-of-the-technology, there is an on-going search for additives to improve the thermal performance of reaction products of radical-curable adhesives. In addition, it would be desirable to provide alternatives, replacements and/or supplements for maleimide-type materials for improving the resistance to thermal degradation of reaction products of radical-curable adhesive compositions.

In particular, it would be desirable to provide additives that tend to be soluble which would lead to adhesive compositions having improved homogenity.

SUMMARY OF THE INVENTION

The present invention meets the desire discussed above by providing radical-curable adhesive compositions, reaction products of which exhibit superior performance at elevated temperatures. The compositions include a (meth)acrylate component; a thermal resistance-conferring component; and a radical cure-inducing composition.

Within the thermal resistance-conferring component are polymerizable aromatic materials having at least one Claisen rearrangable functional group. Such Claisen rearrangable functional groups include allyloxy and allylthiol groups, where the oxygen and the sulfur, respectively, are bound to the aromatic ring. Desirably, such polymerizable aromatic materials should include at least two reactive functional groups, at least one of which is a Claisen rearrangable functional group. In the situation where a reactive functional group other than a Claisen rearrangable one is also present on thermal resistance-conferring component, such a group may be selected from (meth)acrylate, vinyl, styryloxyl, and combinations thereof.

Thermal resistance-conferring components capable of undergoing Claisen rearrangement include those aromatic materials within structure II below:

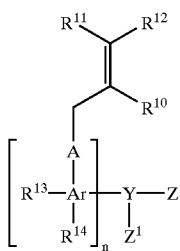

II where
  Ar is an aromatic ring or ring system substituted with a Claisen rearrangable functional group, having at least one aromatic ring which may be joined or fused to additional rings of an aromatic or non-aromatic nature;
  A is O or S;

$R^{10}$, $R^{11}$ and $R^{12}$ may be the same or different and are selected from H, alkyl (such as $C_{1-3}$), phenyl or substituted derivatives;

$R^{13}$ and $R^{14}$ may be the same or different and are selected from H, or A—CH$_2$—CR$^{12}$=CR$^{11}$R$^{12}$, where A, $R^{10}$, $R^{11}$ and $R^{12}$ are as defined above;

n is 1 or 2, provided that
  when n is 1, Z and Z' are not present when Y is H, Z or $Z^1$ are present when Y is carbonyl, sulfoxide, or sulfone, and Z and $Z^1$ are present when Y is linear, branched, cyclic or polycyclic alkyl or alkenyl (such as $C_{1-60}$), or bisalkyl phenylene, and Z or $Z^1$ may be the same or different and are selected from H, linear or branched alkyl, hydroxy alkyl or carboxy alkyl (such as $C_{1-6}$); and
  when n is 2, Z or $Z^1$ is present when Y is alkyl or alkenyl, and Z or $Z^1$ may be the same or different and are selected from H, linear or branched alkyl, hydroxy alkyl or carboxy alkyl (such as $C_{1-6}$), and Z or $Z^1$ is not present when Y is carbonyl, sulfoxide, sulfone, heteroatoms (such as O or S) or a single bond.

The invention also provides a process for preparing reaction products from the radical-curable adhesive compositions of the present invention, the steps of which include applying the composition to a desired substrate surface and exposing the coated substrate surface to conditions which are appropriate to effect cure thereof—e.g., exposure to conditions in which air is substantially excluded therefrom for anaerobic applications, exposure to radiation in the electromagnetic spectrum for photoinitated applications, oxygen in the atmosphere for oxygen triggered cure or heating for thermally activated cure.

Also, the invention provides the reaction products so-formed by the above-described process, which reaction products demonstrate superior thermal properties, such as resistance to degradation at elevated temperatures.

The present invention will be more fully appreciated by a reading of the section entitled, "Detailed Description of the Invention", together with the illustrative examples which follow thereafter and the figures.

DETAILED DESCRIPTION OF THE INVENTION

Figure 1:
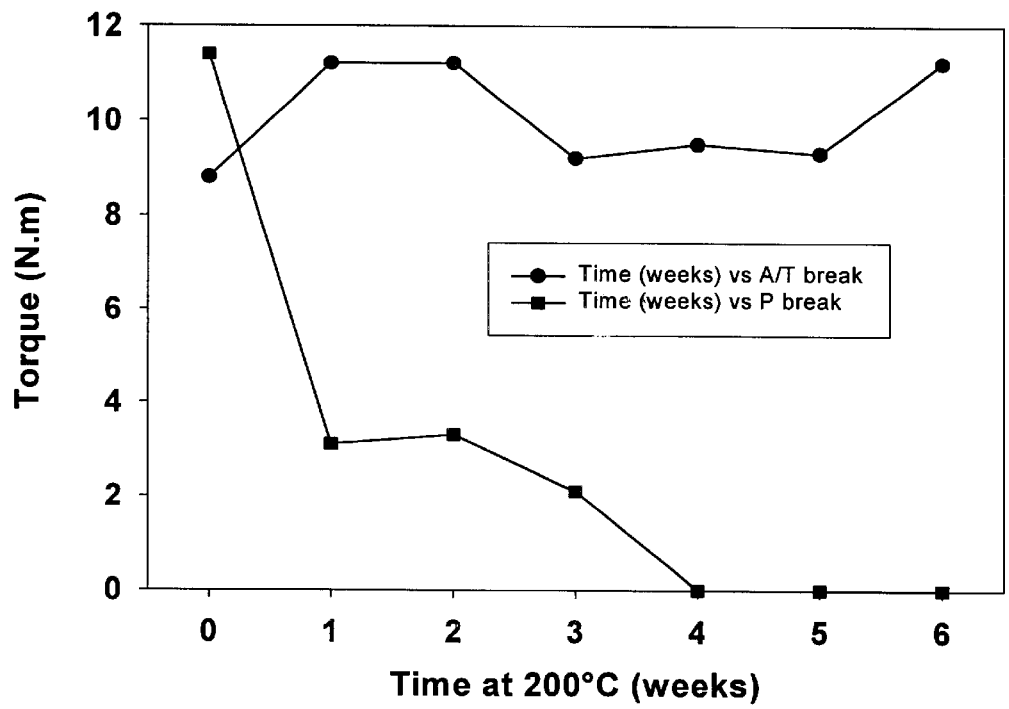
FIG. 1 depicts break torque strength versus heat aging time at a temperature of 200° C. for a composition within the present invention [i.e., a TRIEGMA/DABPA blend, represented as (A/T)] compared to a control composition [PEGMA, represented as (P)].

As noted above, the present invention is directed to radical-curable adhesive compositions which include a (meth)acrylate component; a thermal resistance-conferring component as set forth herein to confer resistance to thermal degradation to reactions products of the compositions; and a radical cure-inducing composition. Reaction products of the compositions of this invention exhibit superior performance, particularly under elevated temperature conditions.

Within the (meth)acrylate component are a wide variety of materials represented by $H_2C=CGCO_2R^{15}$, where G may be hydrogen, halogen or alkyl of 1 to about 4 carbon atoms, and $R^{15}$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific (meth)acrylate monomers particularly desirable for use herein include polyethylene glycol di(meth)acrylates, bisphenol-A di(meth)acrylates, such as ethoxylated bisphenol-A (meth)acrylate ("EBIPA" or "EBIPMA"), and tetrahydrofuran (meth)acrylates and di(meth)acrylates, citronellyl acrylate and citronellyl methacrylate, hydroxypropyl (meth)acrylate, hexanediol di(meth)acrylate ("HDDA" or "HDDMA"), trimethylol propane tri(meth)acrylate, tetrahydrodicyclopentadienyl (meth) acrylate, ethoxylated trimethylol propane triacrylate ("ETTA"), triethylene glycol diacrylate and triethylene glycol dimethacrylate ("TRIEGMA"), and an acrylate ester corresponding to structure III as shown below:

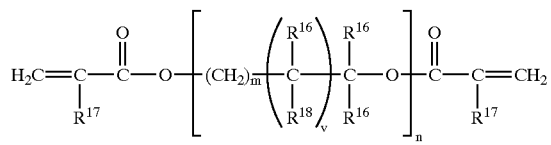

III where
$R^{16}$ may be selected from hydrogen, alkyl of 1 to about 4 carbon atoms, hydroxyalkyl of 1 to about 4 carbon atoms or

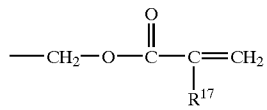

$R^{17}$ may be selected from hydrogen, halogen, and alkyl of 1 to about 4 carbon atoms;
$R^{18}$ may be selected from hydrogen, hydroxy and

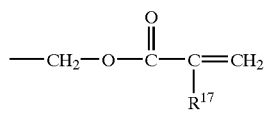

m is an integer equal to at least 1, e.g., from 1 to about 8 or higher, for instance, from 1 to about 4;
n is an integer equal to at least 1, e.g., 1 to about 20 or more; and
v is 0 or 1.
Of course, combinations of these (meth)acrylate monomers may also be used.

The (meth)acrylate component should be present in the inventive compositions in an amount within the range of from about 10 to about 90, such as about 50 parts per hundred ("phr").

Within the thermal resistance-conferring component are polymerizable aromatic materials having at least one Claisen rearrangable functional group. Such Claisen rearrangable functional groups include allyloxy and allylthiol groups where the oxygen and the sulfur, respectively, are bound to the aromatic ring. Desirably, such polymerizable aromatic materials should include at least two reactive functional groups, at least one of which is a Claisen rearrangable functional group. In the situation where a reactive functional group other than a Claisen rearrangable one is also present on the thermal resistance conferring component, such a group may be selected from (meth)acrylate, vinyl, styryloxyl, and combinations thereof.

Within the thermal resistance-conferring component are aromatic compounds, with or without heteroatoms in the ring structure.

Thermal resistance-conferring components capable of undergoing Claisen rearrangement include those aromatic materials within structure II below:

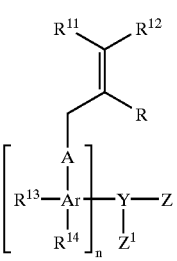

II where
Ar is an aromatic compound substituted with a Claisen rearrangable functional group, having at least one aromatic ring which may be joined or fused to additional rings of an aromatic or non-aromatic nature;
A is O or S;
$R^{10}$, $R^{11}$ and $R^{12}$ may be the same or different and are selected from H, alkyl (such as $C_{1-3}$), phenyl or substituted derivatives;
$R^{13}$ and $R^{14}$ may be the same or different and are selected from H, or $A—CH_2—CR=CR^1R^2$, where A, R, $R^1$ and $R^2$ are as defined above;
n is 1 or 2, provided that
when n is 1, Z and Z' are not present when Y is H, Z or $Z^1$ is present when Y is carbonyl, sulfoxide, or sulfone, and Z and $Z^1$ are present when Y is linear, branched, cyclic or polycyclic alkyl or alkenyl (such as $C_{1-60}$), or bisalkyl phenylene, and Z or $Z^1$ may be the same or different and are selected from H, linear or branched alkyl, hydroxy alkyl or carboxy alkyl (such as $C_{1-6}$); and when n is 2, Z or $Z^1$ is present when Y is alkyl or alkenyl, and Z or $Z^1$ may be the same or different and are selected from H, linear or branched alkyl, hydroxy alkyl or carboxy alkyl (such as $C_{1-6}$), and when Z or $Z^1$ is not present Y is carbonyl, sulfoxide, sulfone, heteroatoms (such as O or S) or a single bond.

More specific representations of Y include:

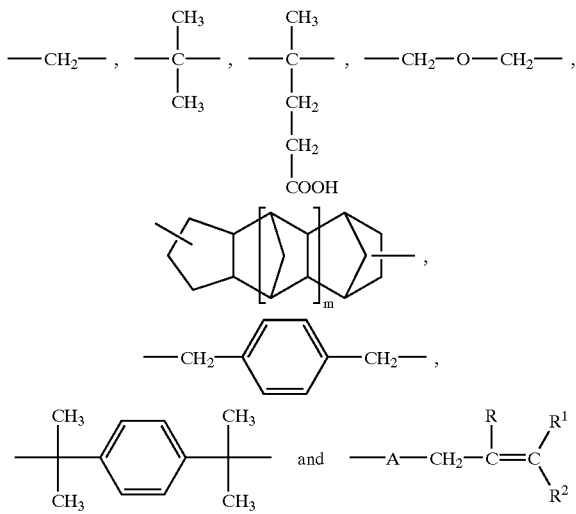

where A, R, $R^1$, and $R^2$ are as defined above, and m is an integer between 0 and 10, inclusive.

In addition, the aromatic ring or ring system having at least one Claisen rearrangable functional group indicates that at least one of the ortho positions to that group is unfunctionalized—that is, substituted with a hydrogen group. Alternatively, in the case of six-membered aromatic rings or ring systems including at least one six-membered aromatic ring, neither ortho position to that group needs to be unfunctionalized provided the para position remains unfunctionalized.

These aromatic rings may be individual rings, or aromatic ring systems having multiple aromatic units joined in fused ring systems, joined in bi-aryl (such as, biphenyl) or bis-aryl (such as, bis-phenol A or bis-phenol F, or bis-phenol compounds joined by a heteroatom) systems, joined in cycloalaphatic-aromatic hybrid ring systems, or joined in oligomeric (such as, novalak-type) systems, examples of which are given below.

Structure IV below represents a class of thermal resistance-conferring components having a fused aromatic structure, a cycloaliphatic-joined aromatic structure, or a cycloaliphatic-aromatic fused/joined aromatic structure having at least one Claisen rearrangable functional group:

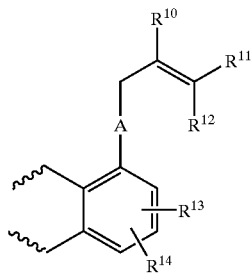

where A, $R^{10}$, $R^{11}$, $R^{12}$, $R^{13}$, and $R^{14}$ are as defined above.

Fused aromatic ring structures include, among others, naphthalene, anthracene, phenanthracene and fluorene.

Two or more Claissen rearrangable functional groups may be present on the structure as a whole, such as two groups on one aromatic ring, or where more than one aromatic ring is present in the structure, the groups may be arranged as appropriate. See e.g., U.S. Pat. No. 5,243,058 (Shiobara), the disclosure of which is hereby expressing incorporated herein by reference.

In addition, reference to structures V and VI shows oligomeric aromatic structures having Claisen rearrangable functional groups on each aromatic ring of the respective oligomer.

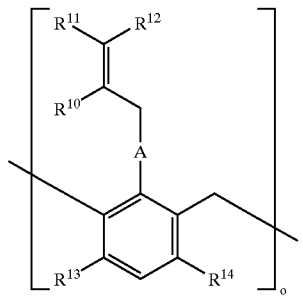

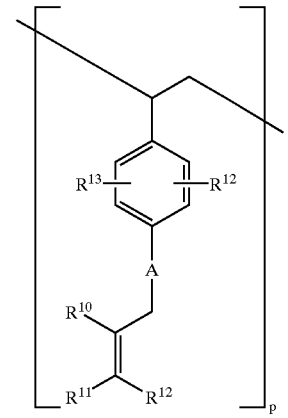

where A, $R^{10}$, $R^{11}$, $R^{12}$, $R^{13}$, and $R^{14}$ are as defined above, and o and p are integers between 1 and 1000, inclusive, such as between 5 and 200, inclusive.

Other thermal resistance-conferring components having Claisen rearrangable functional groups include styryloxy compounds within structure I:

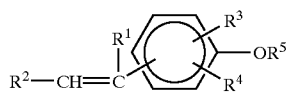

I where R¹ and R² are H, or one of R¹ and R² is H and the other is alkyl; R³ and R⁴ (which may be the same or different) are H, $C_{1-5}$ alkyl or $C_{2-5}$ alkenyl; or one of R³ and R⁴ may be —OR⁵ or $C_{1-5}$ alkoxy or $C_{1-5}$ alkenyloxy, if R² is not methyl; and R⁵ is selected from

where R⁶ is $C_{1-5}$ alkyl, and R⁷, R⁸ and R⁹ may be the same or different and are H or $C_{1-5}$ alkyl.

Specific examples of such thermal resistance-conferring components referred to above include

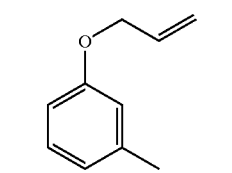

VII

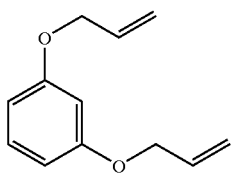

VIII

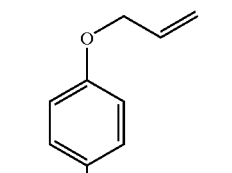

IX

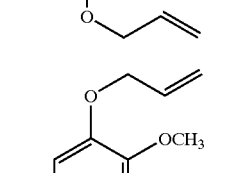

X

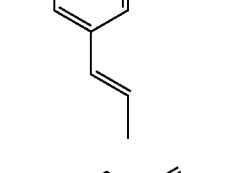

XI

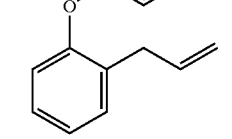

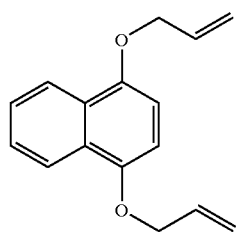

XII

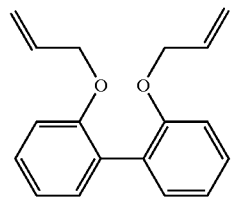

XIII

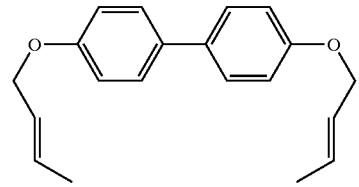

XIV

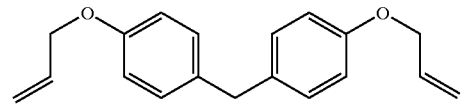

XV

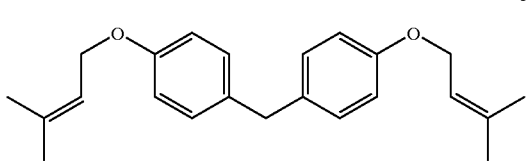

XVI

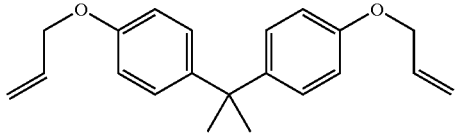

XVII

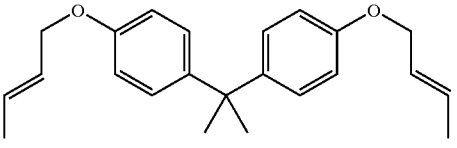

XVIII

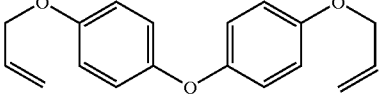

XIX

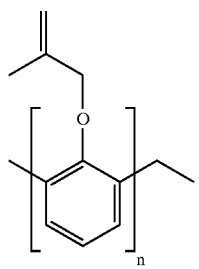

XX

XXI

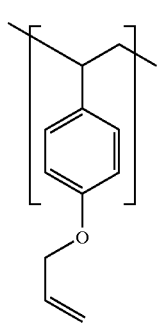

where n and m are as defined above.

XXII

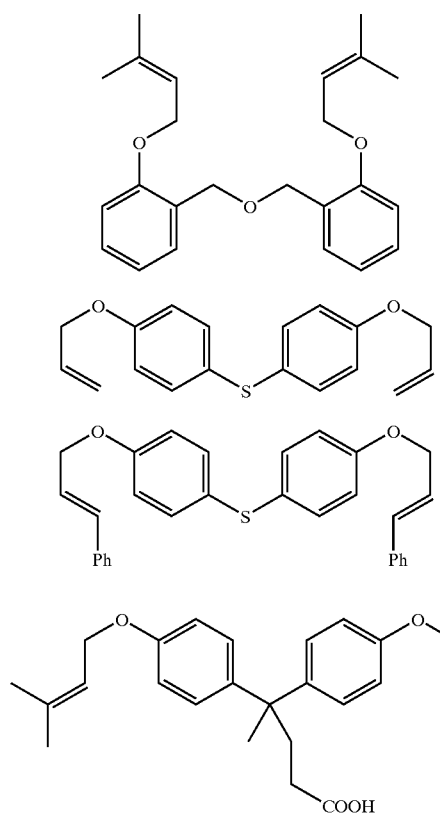

where Ph is phenyl.

XXVIII

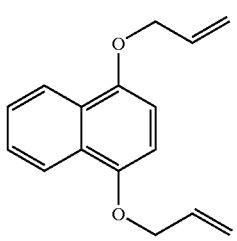

XXIX

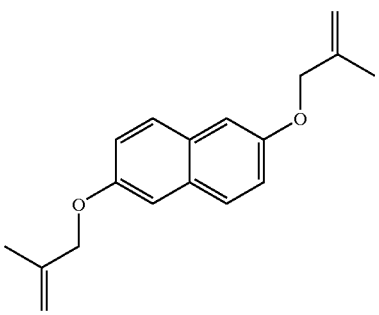

XXX

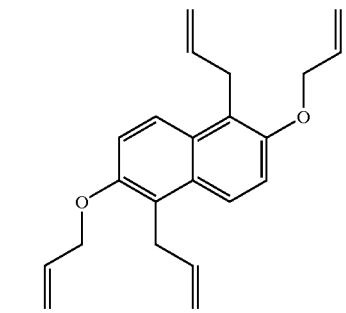

XXXI

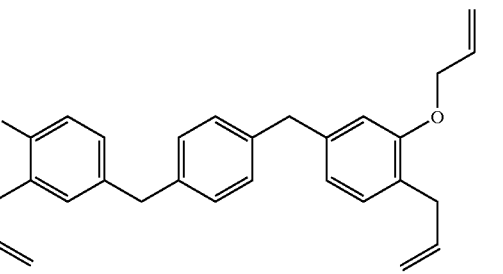

XXXII

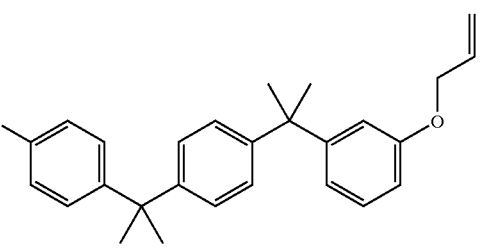

The thermal resistance-conferring component should be present in the inventive compositions in an amount within the range of about 5 phr to about 90 phr, such as 50 phr.

Radical cure-inducing compositions may be chosen from those which initiate cure through anaerobic mechanisms, photoinitiated (such as UV radiation and UV/VIS radiation) mechanisms, oxygen-activated mechanisms, thermally-activated mechanisms and the like.

Anaerobic cure-inducing compositions useful in anaerobically-curable compositions in accordance with the present invention include a variety of components, such as amines (including amine oxides, sulfonamides and triazines). A desirable composition to induce cure in accordance with the present invention includes saccharin, toluidenes, such as N,N-diethyl-p-toluidene and N,N-dimethyl-o-toluidene, acetyl phenylhydrazine ("APH"), and maleic acid. Of course, other materials known to induce anaerobic cure may also be included or substituted therefor. See e.g., U.S. Pat. No. 3,218,305 (Krieble), U.S. Pat. No. 4,180,640 (Melody), U. S. Pat. No. 4,287,330 (Rich) and U.S. Pat. No. 4,321,349 (Rich). Quinones, such as napthoquinone and anthraquinone, may also be included to scavenge free radicals that may form.

Anaerobically curable compositions in accordance with the present invention may also include other components common to conventional anaerobic adhesive formulation, such as free-radical initiators, free-radical accelerators, inhibitors of free-radical generation, as well as metal catalysts.

A number of well-known initiators of free-radical polymerization may be incorporated into compositions of the present invention including, without limitation, hydroperoxides, such as cumene hydroperoxide ("CHP"), para-menthane hydroperoxide, t-butyl hydroperoxide ("TBH") and t-butyl perbenzoate.

Such peroxide compounds may be employed in the present invention in the range of from about 0.1 phr to about 10 phr, with about 0.5 phr to about 5 phr being desirable.

Stabilizers and inhibitors (such as phenols including hydroquinone and quinones) may also be employed to control and prevent premature peroxide decomposition and polymerization of the composition of the present invention, as well as chelating agents [such as diethylenetriamine pentaacetic acid ("DTPA") or the tetrasodium salt of ethylenediamine tetraacetic acid ("EDTA")] to remove trace amounts of metal contaminants therefrom.

Accelerators may be employed to enhance the rate of cure propagation, such as in amounts in the range of about 0.1 phr to about 5 phr, desirably about 1 phr to about 3 phr. When the accelerator is in the form of a metal catalyst solution or a pre-mix, it may be used in an amount in the range of about 0.03 phr to about 0.1 phr.

Other well-known additives such as thickeners, plasticizers, fillers, and the like may be incorporated into the inventive compositions as seen desirable the art-skilled person.

Photoinitiated cure-inducing compositions may be chosen from a variety of materials, such as those commercially available from Ciba Specialty Chemicals Corp., Tarrytown, N.Y. under the tradename "IRGACURE" and "DAROCUR", such as "IRGACURE" 184 (1-hydroxycyclohexyl phenyl ketone), 907 (2-methyl-1-[4-(methylthio)phenyl]-2-morpholino propan-1-one), 369 [2-benzyl-2-N,N-dimethylamino-1-(4-morpholinophenyl)-1-butanone], 500 (the combination of 1-hydroxy cyclohexyl phenyl ketone and benzophenone), 651 (2,2-dimethoxy-2-phenyl acetophenone), 1700 [the combination of bis(2,6-dimethoxybenzoyl-2,4-,4-trimethyl pentyl) phosphine oxide and 2-hydroxy-2-methyl-1-phenyl-propan-1-one] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one); photoinitiators available commercially from Union Carbide Chemicals and Plastics Co., Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC.

Additional photoinitiated cure-inducing compositions may be chosen from those available from Sartomer, Inc., Exton, Pa. under the tradenames "ESACURE" and "SARCAT". Examples include "ESACURE" KB1 (benzil dimethyl ketal), "ESACURE" EB3 (mixture of benzoin and butyl ethers), "ESACURE" TZT (trimethylbenzophenone blend), "ESACURE" KIP100F (α-hydroxy ketone), "ESACURE" KIP150 (polymeric hydroxy ketone), "ESACURE" KT37 (blend of "ESACURE" TZT and KIP150), "ESACURE" KT046 (blend of triphenyl phosphine oxide, "ESACURE" KIP150 and TZT), "ESACURE" X33 (blend of 2- and 4-isopropylthioxanthone, ethyl 4-(dimethyl amino) benzoate and "ESACURE" TZT], "SARCAT" CD 1010 [triaryl sulfonium hexafluoroantimonate (50% in propylene carbonate)], "SARCAT" DC 1011 [triaryl sulfonium hexafluorophosphate (50% n-propylene carbonate)], "SARCAT" DC 1012 (diaryl iodonium hexafluoroantimonate), and "SARCAT" K185 [triaryl sulfonium hexafluorophosphate (50% in propylene carbonate)].

Photoinitiated cure-inducing compositions include triarylsulfonium and diaryliodonium salts containing non-nucleophilic counterions and aryl diazonium salts, examples of which include 4-methoxybenzenediazonium hexafluorophosphate, benzenediazonium tetrafluoroborate, diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoroarsenate, and diphenylthiophenoxyphenylsulfonium hexafluoroantimonate.

Of course, combinations of such photoinitiated cure-inducing compositions may be used as deemed appropriate by those of ordinary skill in the art.

Thermally-activated latent curing compositions may be chosen from those available commercially from E. I. duPont and de Nemeurs, Wilmington, Del. under the tradenames "LUPERSOL", "DELANOX-F", "ALPEROX-F", "LUCIDOL", "LUPERCO", and "LUPEROX".

Examples include "LUPERSOL" DDM-9 (mixtures of peroxides and hydroperoxides), "LUPERSOL" DDM-30 (mixtures of peroxides and hydroperoxides), "LUPERSOL" DELTA-X-9 (mixtures of peroxides and hydroperoxides), "LUPERSOL" DHD-9 (mixtures of peroxides and hydroperoxides), "LUPERSOL" DFR (mixtures of peroxides and hydroperoxides), "LUPERSOL" DSW-9 (mixtures of peroxides and hydroperoxides), "LUPERSOL" 224 (2,4-pentanedione peroxide), "LUPERSOL" 221 [di(n-propyl) peroxydicarbonate], "LUPERSOL" 225 [di(s-butyl) peroxydicarbonate], "LUPERSOL" 225-M75 [di(s-butyl) peroxydicarbonate], "LUPERSOL" 225-M60 [di (s-butyl) peroxydicarbonate], "LUPERSOL" 223 [di(2-ethylhexyl) peroxydicarbonate], "LUPERSOL" 223-M75 [di(2-ethylhexyl)peroxydicarbonate], "LUPERSOL" 223-M40 [di (2-ethylhexyl)peroxydicarbonate], "LUPERSOL" 219-M60 (diisononanoyl peroxide), "LUCIDOL" 98 (benzoyl peroxide), "LUCIDOL" 78 (benzoyl peroxide), "LUCIDOL" 70 (benzoyl peroxide), "LUPERCO" AFR-400 (benzoyl peroxide), "LUPERCO" AFR-250 (benzoyl peroxide), "LUPERCO" AFR-500 (benzoyl peroxide), "LUPERCO" ANS (benzoyl peroxide), "LUPERCO" ANS-P (benzoyl peroxide), "LUPERCO" ATC (benzoyl peroxide), "LUPERCO" AST (benzoyl peroxide), "LUPERCO" AA (benzoyl peroxide), "LUPERCO" ACP (benzobyl peroxide), "LUPERSOL" 188M75 (α-cumylperoxy neodecanoate), "LUPERSOL" 688T50 (1,1-dimethyl-3-hydroxy-butyl peroxyneoheptanoate), "LUPERSOL" 688M50 (1,1-dimethyl-3-hydroxy-butyl peroxyneoheptanoate), "LUPERSOL" 288M75 (α-cumyl peroxyneoheptanoate), "LUPERSOL" 546M75 (t-amylperoxy neodecanoate), "LUPERSOL" 10 (t-butylperoxy neodecanoate), "LUPERSOL" 10M75 (t-butylperoxy neodecanoate), "LUPERSOL" 554M50 (t-amylperoxypivalate), "LUPERSOL" 554M75 (t-amylperoxypivalate), "LUPERSOL" 11 (t-butylperoxypivalate), "LUPERSOL" 665T50 (1-1-dimethyl-3-hydroxy-butylperoxy-2-ethylhexanoate), "LUPERSOL" 665M50 (1-1-dimethyl-3-hydroxy-butylperoxy-2-ethylhexaanoate), "LUPERSOL" 256 [2,5-dimethyl-2,5-di(2-ethylhexanoyl peroxy) hexane], "LUPERSOL" 575 (t-amylperoxy-2-ethyl-hexanoate), "LUPERSOL" 575P75 (t-amylperoxy-2-ethyl-hexanoate), "LUPERSOL" 575M75 (t-amylperoxy-2-ethyl-hexanoate), t-BUTYL PEROCTOATE (t-butylperoxy-2-ethylhexanoate), "LUPERSOL" PMS (t-butylperoxy-2-ethylhexanoate), "LUPERSOL" PDO (t-butylperoxy-2-ethylhexanoate), "LUPERSOL" 80 (t-butyl peroxyisobutyrate), "LUPERSOL" PMA (t-butyl peroxymaleic acid), "LUPERCO" PMA-25 (t-butyl peroxymaleic acid), "LUPERSOL" 70 (t-butyl peroxyacetate), "LUPERSOL" 75-M (t-butyl peroxyacetate), LUPERSOL" 76-M (t-butyl peroxyacetate), "LUPERSOL" 555M60 (t-amyl peroxy-acetate), "LUPERSOL" KDB (di-t-butyl diperoxyphthalate), "LUPERSOL" TBIC-M75 (OO-t-butyl-O-isopropyl monoperoxycarbonate), "LUPEROX" 118 [2,5-dimethyl-2,5-di(benzoylperoxy) hexane], "LUPERSOL" TBEC [OO-t-butyl-O-(2-ethylhexyl) monoperoxycarbonate], "LUPERSOL" TAEC [OO-t-amyl-O -(2-ethylhexyl) monoperoxycarbonate], "LUPEROX" 500R (dicumyl peroxide), "LUPEROX" 500T (dicumyl peroxide), "LUPERCO" 500-40C (dicumyl peroxide), "LUPERCO" 500-40E (dicumyl peroxide), "LUPERCO" 500-SRK (dicumyl peroxide), "LUPERSOL" 101 [2,5-dimethyl-2,5-di-(t-butylperoxy) hexane], "LUPERSOL" 101-XL [2,5-dimethyl-2,5-di-(t-butylperoxy) hexane], "LUPERCO" 101-P20 [2,5-dimethyl-2,5-di-(t-butylperoxy) hexane], "LUPERSOL" 801 (t-butyl cumyl peroxide), "LUPERCO" 801-XL (t-butyl cumyl peroxide), "LUPEROX" 802 [αα-bis(t-butylperoxy) diisopropylbenzene], "LUPERCO" 802-40KE [αα-bis(t-butylperoxy)diisopropylbenzene], "LUPERSOL" 130 [2,5-dimethyl-2,5-di-(t-butylperoxy)hexyne-3], "LUPERCO" 130-XL [2,5-dimethyl-2,5-di-(t-butylperoxy)hexyne-3], "LUPEROX" 2,5-2,5 (2,5-dihydro-peroxy-2,5-dimethylhexane), "LUPERSOL" 230 [n-butyl-4,4-di-(t-butylperoxy)valerate], "LUPERCO" 230-XL [n-butyl-4,4-di-(t-butylperoxy)valerate], "LUPERSOL" 231 [1,1-di(t-butylperoxy)-3,3,5-trimethyl cyclohexane], "LUPERCO" 231-XL [1,1-di(t-butylperoxy) 3,3,5-trimethyl cyclohexane], "LUPERSOL" 231-P75 [1,1-di(t-butylperoxy) 3,3,5-trimethyl cyclohexane], "LUPERCO" 231-SRL [1,1-di(t-butylperoxy)-3,3,5-trimethyl cyclohexane], "LUPERSOL" 331-80B [1,1-di(t-butylperoxy)cyclohexane], "LUPERCO" 331-XL [1,1-di(t-butylperoxy)cyclohexane], "LUPERSOL" 531-80B [1,1-di (t-amylperoxy)cyclohexane], "LUPERSOL" 531-80M [1,1-di(t-amylperoxy)cyclohexane], "LUPERSOL" 220-D50 [2,2-di(t-butylperoxy)butane], "LUPERSOL" 233-M75 [ethyl-3,3-di(t-butylperoxy)butyrate], "LUPERCO" 233-XL [ethyl-3,3-di(t-butylperoxy)butyrate], "LUPERSOL" P-31 [2,2-di-(t-amylperoxy) propane], "LUPERSOL" P-33 [2,2-di-(t-amylperoxy) propane], and "LUPERSOL" 553-M75 [ethyl 3,3-di(t-amylperoxy)butyrate].

Other thermally-activated latent curing compositions include those available commercially from DuPont under the "VAZO" tradename, such as "VAZO" 64 (azobis-isobutyrile nitrile), "VAZO" 67 (butane nitrile, 2-methyl, 2,2'-azobis) and "VAZO" 88 (cyclohexane carbonitrile, 1,1'-azobis).

The radical cure-inducing composition should be present generally within the range of from about 0.001 phr to about 10 phr, such as from about 1 phr to about 5 phr.

The compositions of the present invention may be prepared using conventional methods, well known to those persons of skill in the art. For instance, the components of the inventive compositions may be combined together with mixing in any convenient order consistent with the roles and functions the components are to perform in the compositions. Conventional mixing techniques using known apparatus may be employed.

The compositions of this invention may be applied to a variety of substrates, such as steel, brass, aluminum, zinc and other metals and alloys. In addition, in the context of anaerobic adhesives, synthetic or composite substrates may be used, provided an appropriate primer or activator composition is first applied thereon, if necessary.

The compositions of this invention may also be used to impregnate the pores of substrates constructed from such materials. See e.g., U.S. Pat. No. 5,618,857, the disclosure of which is hereby expressly incorporated herein by reference.

A-stage curing of the compositions occurs ordinarily upon the generation of radicals, such as under anaerobic conditions—that is, upon the exclusion of air from the environment surrounding the applied composition.

Typically, A-stage curing radical polymerization, should occur at a lower temperature than the temperature at which B-stage curing, or Claisen rearrangement, occurs (from about ambient to about 100° C.)

In order to induce B-stage curing of the composition through the Claisen rearrangable functional group(s), the radically-cured composition may be exposed to elevated temperature conditions, such as at least about 100° C., desirably within the range of from about 150° C. to about 250° C. A reaction time in the range of about 2–4 hours is generally suitable at a temperature of about 150° C. At higher temperatures shorter times may be employed, while at lower temperatures longer times may be required. Typically, Claisen rearrangement reactions occur in the presence of an acid catalyst. In addition, the acid catalyst is believed to promote B-stage curing as well. However, certain radically-cured adhesive compositions within the scope of the invention may undergo Claisen rearrangement even in the absence of an added acid catalyst, rendering the catalyst an optional component.

The following examples are provided to further illustrate the present invention. Many other practical opportunities exist with respect to the teaching herein, which will become readily apparent to those persons of skill in the art upon a review of the examples.

EXAMPLES

I. Preparation of Radical-Curable Adhesive Compositions

An equimolar blend of diallyl ether bisphenol A ("DABPA") and triethylene glycol dimethacrylate ("TRIEGMA") was prepared by dissolving 308 g of DABPA in 2.86 g of TRIEGMA. Anaerobic adhesive compositions were then prepared by mixing together the components shown in Table 1. The formulation designated A/T is representative of a composition within the scope of the present invention, whereas the formulation designated P is representative of a comparative anaerobic adhesive [such as polyethylene glycol dimethacrylate ("PEGMA")], which iteself does not provide the improved physical properties discussed herein.

TABLE 1

Composition of Anaerobic Adhesives

| COMPONENT | A/T | P |
|---|---|---|
| Equimolar DABPA/TRIEGMA blend | 94.45 | 0 |
| PEGMA | 0 | 94.45 |
| Cumene hydroperoxide | 1.5 | 1.5 |
| Saccharin | 1.5 | 1.5 |
| Dimethyl-p-toluidine | 1.5 | 1.5 |
| Iodonium salt catalyst, UV9310c | 1.0 | 1.0 |
| 1,4-naphthoquinone | 0.05 | 0.05 |

The amounts are expressed in % by weight of total composition.

The iodonium salt, UV9310c, is a latent acid catalyst [a solution of bis(4-dodecylphenyl)iodonium hexafluoroantimonate in inert solvent], commercially available from General Electric Company.

II. Adhesive Testing of Anaerobic Compositions

Figure 2:
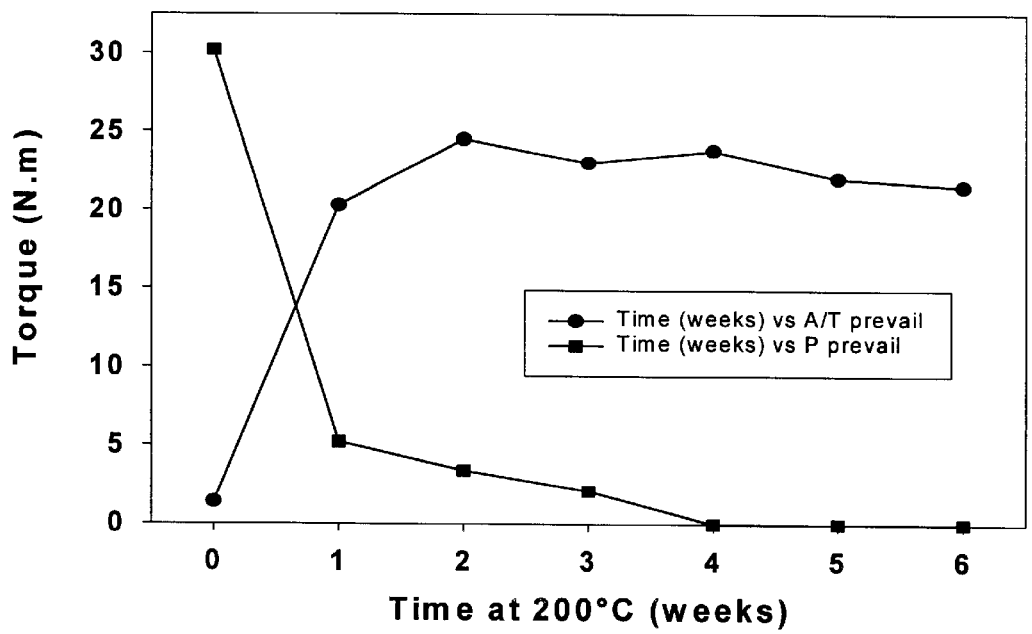
FIG. 2 depicts a plot of prevailing torque strength versus heat aging time at a temperature of 200° C. for a composition within the scope of the present invention [i.e., a TRIEGMA/DABPA blend) represented as (A/T)] compared to a control composition [PEGMA, represented as (P)].

The ability of the anaerobic adhesives to maintain adhesive strength on threaded fasteners after prolonged exposure to high temperatures was determined by torque strength testing, according to test method ISO10964. Test specimens were assembled by applying adhesive to the threads of cleaned M10 steel bolts. When the threads of the bolts were wet with the adhesive, the corresponding nuts were applied. The assembled nut and bolt specimens were kept at room temperature for 24 hours to allow for complete curing. Five specimens were selected and the average break and prevailing torque strength determined using a calibrated torque analyzer. The remaining specimens were placed in an oven maintained at a temperature 200° C. and samples withdrawn each week over a six-week period,. The specimens were allowed to cool to ambient temperature and torque strengths measured by the procedure above (average of 5 measurements). The results obtained in Newton-meters are presented in Table 2 and the individual break and prevailing torque strength values given in FIGS. 1 and 2.

TABLE 2

Average Break and Prevailing Torque Strengths of Anaerobic Adhesive Compositions After Heat Aging

| Time (weeks @ 200° C.) | Break-torque strength (N-m) | | Prevailing torque strength (N-m) | |
|---|---|---|---|---|
| | A/T | P | A/T | P |
| 0 | 8.8 | 11.4 | 1.4 | 30.2 |
| 1 | 11.2 | 3.1 | 20.3 | 5.2 |
| 2 | 11.2 | 3.3 | 24.5 | 3.4 |
| 3 | 9.2 | 2.1 | 23.0 | 2.1 |
| 4 | 9.5 | 0 | 23.8 | 0 |
| 5 | 9.3 | 0 | 22.0 | 0 |
| 6 | 11.2 | 0 | 21.5 | 0 |

After curing at room temperature for 24 hours, both compositions demonstarted high break-torque strength values. However, after 1 week at a temperature of 200° C., the PEGMA composition ("P") had lost about 75% of it's original value. In contrast, the DABPA/TRIEGMA composition ("A/T") had increased its value by about 25%. Continued heat aging shows that P rapidly lost its remaining strength and failed after 4 weeks, whereas A/T showed no loss of its original strength after 6 weeks at 200° C. (See FIG. 1.)

The prevailing strengths showed a slightly different trend. (See FIG. 2.) In this case, the room temperature prevailing strength for A/T was observed to be very low, whereas the corresponding prevailing strength for P was observed to be high. While not wishing to be bound by theory, it is believed that DABPA is not expected to participate in the curing reaction at ambient temperature, and as such remains unreacted under these conditions, serving as a plasticizer and weakening the adhesive bond that forms.

However, on initial heating, the prevailing torque strength of A/T rapidly increased, whereas that of P sharply decreased. On prolonged heating, the high prevailing strength of A/T was maintained, showing little deterioration after 6 weeks. In contrast, P rapidly deteriorated, failing completely within 4 weeks. (See FIG. 2.)

Figure 3:
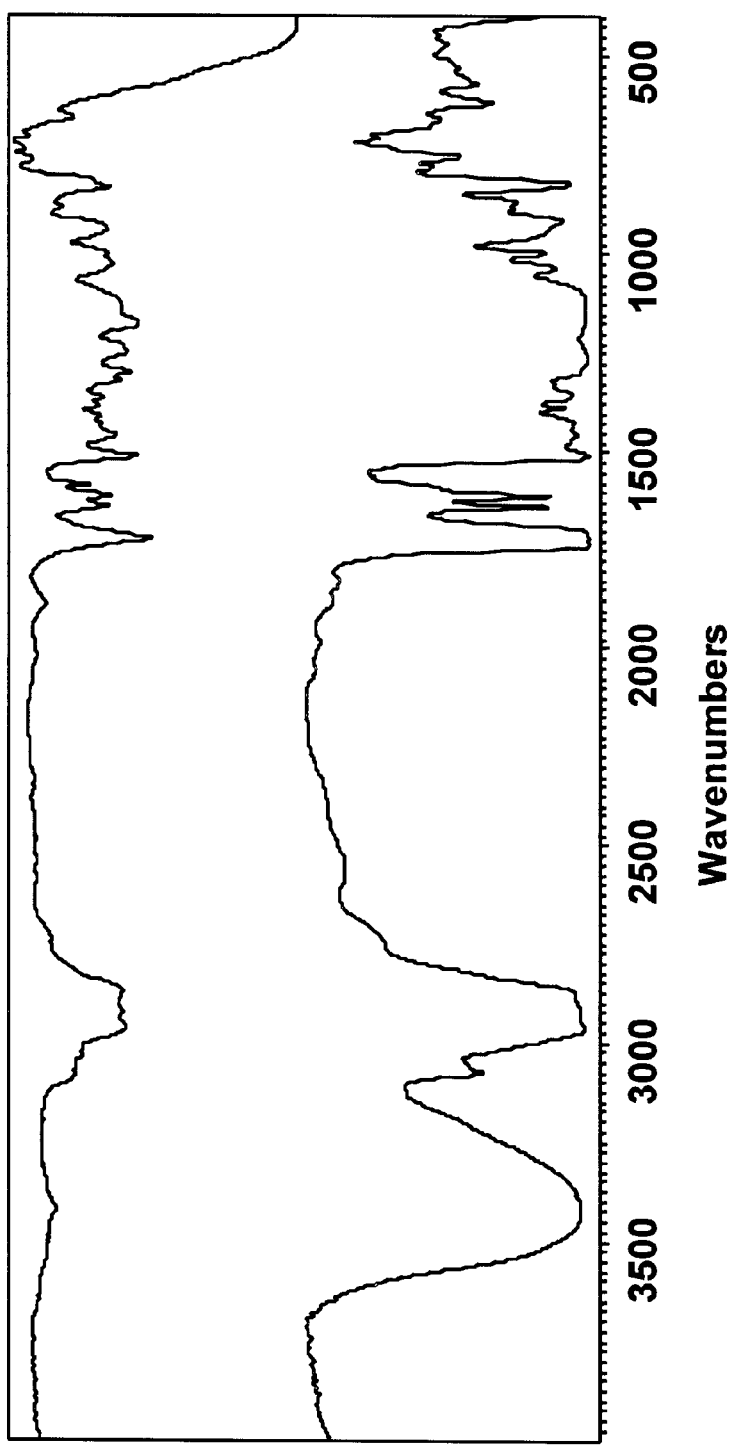
FIG. 3 depicts a plot of IR spectra of a composition within the scope of the present invention (i.e., DABPA/TRIEGMA blend) before heating (upper spectra) and after heating (lower spectra) at a temperature of 200° C. for a period of 1 hour.

IR analysis confirmed that the allylic component of A/T was rapidly converted to the corresponding phenol (by Claisen rearrangement) during the initial haeting period as indicated by the formation of an intense peak at ~3400 cm$^{-1}$ (see FIG. 3).

III. Photocurable Adhesive Compositions

An equimolar blend of DABPA and ethoxylated trimethylolpropane triacrylate ("ETTA") was prepared by dissolving 30.8 g of DABPA in 42.8 g of ETTA. Photocurable adhesive compositions were then prepared by mixing together the components shown in Table 3. The composition designated A/E is representative of a photocurable adhesive composition within the scope of the invention, whereas E is representative of a comparative photocurable adhesive composition.

TABLE 3

Composition of Photocurable Adhesives

| COMPONENT | A/E | E |
|---|---|---|
| Equimolar DABPA/ETTA blend | 96 | 0 |
| ETTA | 0 | 96 |
| 2-hydroxy-2-methyl-1-phenylpropan-1-one | 3 | 3 |
| Sulfonium salt catalyst, CYRACURE UVI 6974 | 1 | 1 |

The amounts are expressed in % by weight of total composition.

Thin film coatings, approximately 0.5 mm in film thickness, of A/E and E were prepared on glass plates by means of a drawdown bar. The coatings were exposed to UV light from an Oriel lamp projector, fitted with a mercury arc lamp, for a time period of 60 seconds The incident light intensity was 30 mW/cm$^2$ in the wavelength range of about 300–400 nm. After irradiation, the liquid films hardened to clear solid films having tacky uncured top-layers. The process was repeated with a thin polyethylene film on the surface of the dispensed liquid films. After exposure, the polyethylene film was removed from the films to give completely dry clear solid films of compositions A/E and E, respectively.

These examples are provided solely for illustrative purposes, and are in no way intended to limit the spirit and scope of the invention as defined by the claims.

What is claimed is:

1. A radical curable composition, reaction products of which demonstrate resistance to thermal degradation at elevated temperatures, comprising:

(a) a (meth)acrylate component;
(b) a thermal resistance-conferring component including polymerizable aromatic materials having reactive groups consisting of at least one Claisen rearrangable functional group; and
(c) a radical cure-inducing composition.

2. The composition according to claim 1, wherein the thermal resistance-conferring component is selected from the group consisting of one or more of the following structures IV, V, or VI:

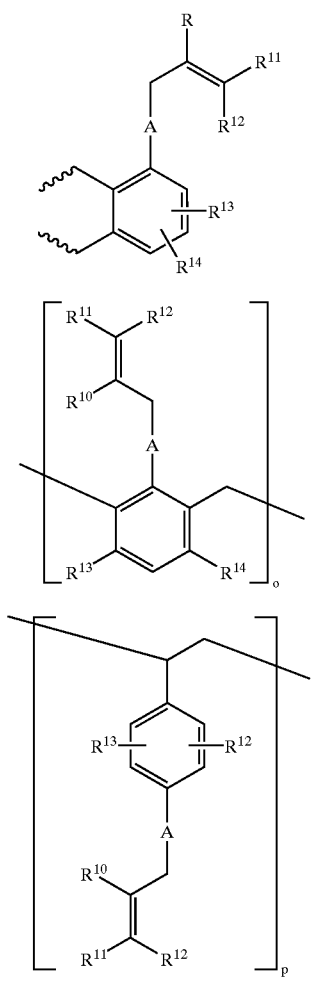

wherein
A is O or S;
$R^{10}$, $R^{11}$ and $R^{12}$ may be the same or different and are selected from H, and alkyl, or phenyl;
$R^{13}$ and $R^{14}$ may be the same or different and are selected from H, and one or more substituents that are Claisen rearrangable and/or reactive toward radicals and/or under elevated temperature conditions; and
o and p are integers between 1 and 1,000, inclusive.

3. The composition according to claim 2, wherein the fused aromatic ring structure is selected from the group consisting of naphthalene, anthracene, phenanthracene and fluorene.

4. The composition according to claim 1, wherein the (meth)acrylate component is represented by; $H_2C=CGCO_2R_{15}$, wherein G is a member selected from the group consisting of hydrogen, halogen or alkyl of 1 to about 4 carbon atoms, and $R_{15}$ is a member selected from the group consisting of alkyl, cycloalkyl, alkenyl, cycloalkenyl, alkaryl, aralkyl and aryl groups having from 1 to about 16 carbon atoms, any of which may be optionally substituted or interrupted with a member selected from the group consisting of silane, silicon, oxygen, halogen, carbonyl, hydroxyl, ester, carboxylic acid, urea, urethane, carbamate, amine, amide, sulfur, sulonate and sulfone.

5. The composition according to claim 1, wherein the (meth)acrylate component is a member selected from the group consisting of polyethylene glycol di(meth)acrylates, citronellyl methacrylate, bisphenol-A di(meth)acrylates, citronellyl acrylate, tetrahydrofuran (meth)acrylates, tetrahydrofuran di(meth)acrylates, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and an acrylate ester corresponding to

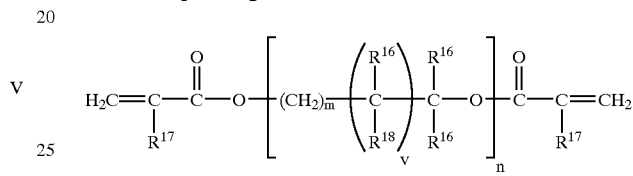

wherein
$R^{16}$ is a member selected from the group consisting of hydrogen, and alkyl and hydroxyalkyl groups having from 1 to about 4 carbon atoms and

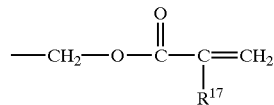

$R^{17}$ is a member selected from the group consisting of hydrogen, halogen, and alkyl groups having from 1 to about 4 carbon atoms;
$R^{18}$ is a member selected from the group consisting of hydrogen, hydroxy and

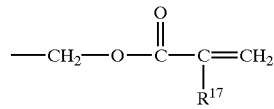

m is an integer equal to at least 1;
n is an integer equal to at least 1; and
v is 0 or 1,
and combinations of the above acrylate components.

6. The composition according to claim 1, wherein the radical cure-inducing composition is selected from the group consisting of anaerobic curing-inducing compositions, photoinitiated cure-inducing compositions, thermally-activated cure-inducing compositions, and combinations thereof.

7. The composition according to claim 6, wherein the anaerobic cure-inducing composition comprises saccharin, toluidenes, acetyl phenylhydrazine, and maleic acid.

8. The composition according to claim 6, wherein the thermally-activated composition is a member selected from the group consisting of peroxides, hydroperoxides, 2,4-pentanedione peroxide, di(n-propyl)peroxydicarbonate, di(s-butyl)peroxydicarbonate, di(2-ethylhexyl)

peroxydicarbonate, diisononanoyl peroxide, benzoyl peroxide, α-cumylperoxy neodecanoate, 1,1-dimethyl-3-hydroxy-butyl peroxyneoheptanoate, α-cumyl peroxyneoheptanoate, t-amylperoxy neodecanoate, t-butylperoxy neodecanoate, t-butylperoxy neodecanoate, t-amylperoxypivalate, t-butylperoxypivalate, 1,1-dimethyl-3-hydroxy-butylperoxy-2-ethylhexanoate, 2,5-dimethyl-2,5-di(2-ethylhexanoyl peroxy) hexane, t-amylperoxy-2-ethyl-hexanoate, t-butyl peroctanoate, t-butylperoxy-2-ethylhexanoate, t-butyl peroxyisobutyrate, t-butyl peroxymaleic acid, t-butyl peroxyacetate, t-amyl peroxyacetate, di-t-butyl diperoxyphthalate, OO-t-butyl-O-isopropyl monoperoxycarbonate, 2,5-dimethyl-2,5-di(benzoylperoxy) hexane, OO-t-butyl-O-(2-ethylhexyl) monoperoxycarbonate, OO-t-amyl-O-(2-ethylhexyl) monoperoxycarbonate, dicumyl peroxide, 2,5-dimethyl-2,5-di-(t-butylperoxy) hexane, t-butyl cumyl peroxide, αα-bis(t-butylperoxy)diisopropylbenzene, 2,5-dimethyl-2,5-di-(t-butylperoxy)hexyne-3,2,5-dihydro-peroxy-2,5-dimethylhexane, n-butyl-4,4-di-(t-butylperoxy)valerate, 1,1-di(t-butylperoxy)-3,3,5-trimethyl cyclohexane, 1,1-di(t-butylperoxy)cyclohexane, 2,2-di(t-butylperoxy)butane, ethyl-3,3-di(t-butylperoxy)butyrate, 2,2-di-(t-amylperoxy)propane, ethyl 3,3-di(t-amylperoxy)butyrate, azobis-isobutyrile nitrile, butane nitrile, 2-methyl, 2,2'-azobis, cyclohexane carbonitrile, 1,1'-azobis and combinations thereof.

9. The compositions according to claim 6, wherein the photoinitiated cure-inducing composition is a member selected from the group consisting of 1-hydroxycyclohexyl phenyl ketone, (2-methyl-1-[4-(methylthio)phenyl]-2-morpholino propan-1-one), 2-benzyl-2-N,N-dimethylamino-1-(4-morpholinophenyl)-1-butanone, 1-hydroxy cyclohexyl phenyl ketone, benzophenone, 2,2-dimethoxy-2-phenyl acetophenone, bis(2,6-dimethoxybenzoyl-2,4-,4-trimethyl pentyl) phosphine oxide, 2-hydroxy-2-methyl-1-phenyl-propan-1-one, 2-hydroxy-2-methyl-1-phenyl-1-propane, 2,4,6-trimethylbenzoyldiphenyl-phosphine oxide, 2-hydroxy 2-methyl-1-phenyl-propan-1-phenyl-propan-1-one, mixed triaryl sulfonium hexafluoroantimonate salts, mixed triaryl sulfonium hexafluorophosphate salts, dl-camphorquinone, benzil dimethyl ketal, benzoin butyl ethers, trimethylbenzb-phenone blend, α-hydroxy ketone, polymeric hydroxy ketone, triphenyl phosphine oxide, 2- and 4-isopropylthioxanthone, ethyl 4-(dimethyl amino) benzoate, diaryl iodonium hexafluoroantimonate, triaryl sulfonium hexafluorophosphate, and combinations thereof.

10. Reaction products formed from the composition according to claim 1, upon exposure to conditions in which air is substantially excluded therefrom under ambient temperature conditions.

11. Reaction products formed from the composition according to claim 1, upon exposure to conditions in which (a) air is substantially excluded therefrom and (b) the temperature conditions are elevated beyond room temperature.

12. Reaction products formed from the composition according to claim 9, upon exposure to UV radiation.

13. A process for preparing a reaction product from the radical-curable adhesive composition according to claim 1, the steps of which include:
applying the composition to a substrate surface and
exposing the coated substrate surface to conditions which are appropriate to effect cure thereof.

14. A process for preparing the radical-curable adhesive composition according to claim 1, (the step of which includes:

combining with mixing the (meth)acrylate component, the coreactant, optionally the thermal resistance-conferring agent, and the radical cure-inducing composition.

15. The composition according to claim 1, wherein the thermal resistance-conferring component is selected from the following compounds:

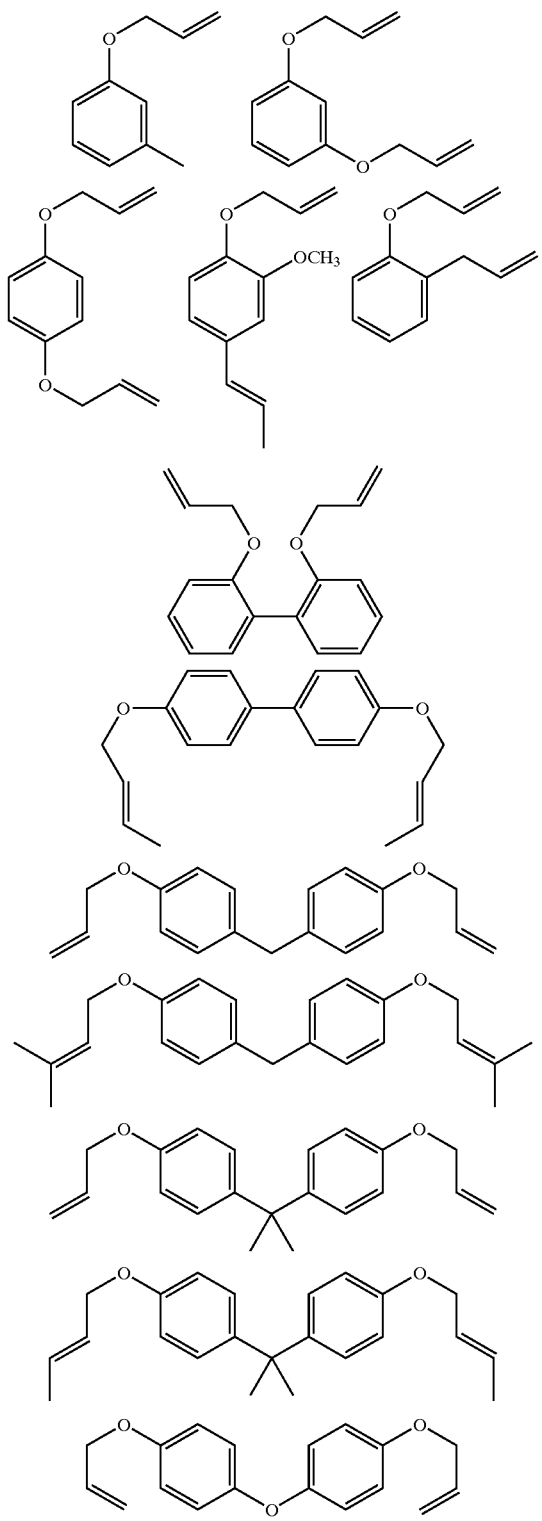

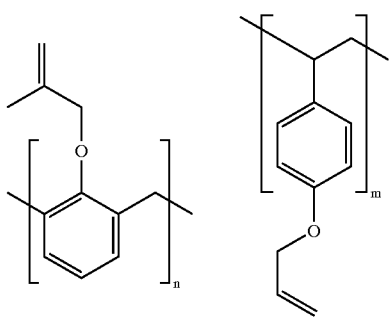

wherein n and m are as defined above;

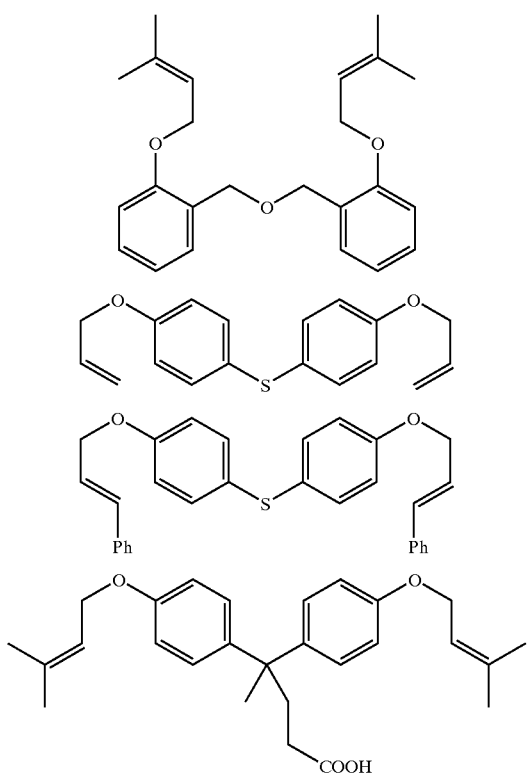

wherein Ph is phenyl;

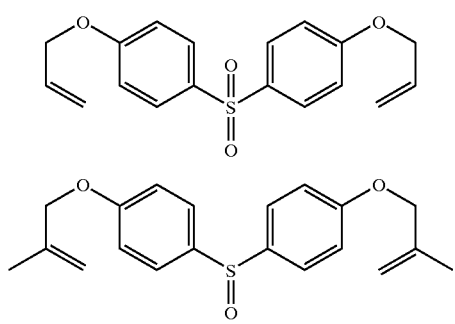

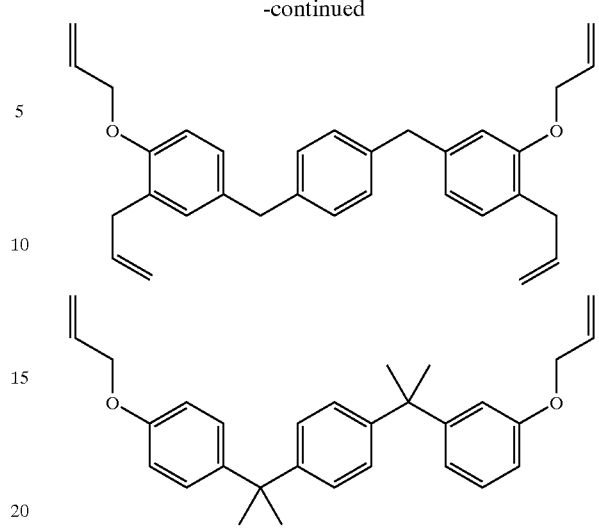

16. The composition according to claim 1, wherein the thermal resistance-conferring component is represented by structure II:

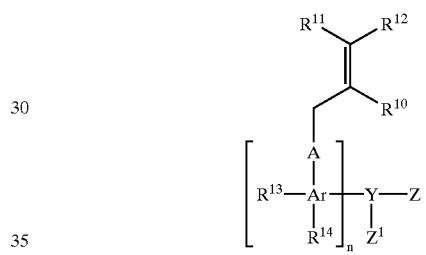

wherein

Ar is an aromatic compound substituted with a Claisen rearrangable functional group, having at least one aromatic ring which may be joined or fused to additional rings of an aromatic or non-aromatic nature;

A is O or S;

$R^{10}$, $R^{11}$ and $R^{12}$ may be the same or different and are selected from H, alkyl, phenyl or substituted derivatives;

$R^{13}$ and $R^{14}$ may be the same or different and are selected from H, or A—CH$_2$—CR$^{10}$=CR$^{11}$R$^{12}$, wherein A, $R^{10}$, $R^{11}$ and $R^{12}$ are as defined above; and n is 1 or 2, provided that where n is 1, Z and Z' are not present when Y is H, Z or $Z^1$ is present when Y is carbonyl, sulfoxide, or sulfone, and Z and $Z^1$ are present when Y is linear, branched, cyclic or polycyclic alkyl or alkenyl, or bisalkyl phenylene, and Z or $Z^1$ may be the same or different and are selected from H, linear or branched alkyl, hydroxy alkyl or carboxy alkyl; and when n is 2, Z or $Z^1$ is present when Y is alkyl or alkenyl, and Z or $Z^1$ may be the same or different and are selected from H, linear or branched alkyl, hydroxy alkyl or carboxy alkyl, and Z or $Z^1$ is not present when Y is is carbonyl, sulfoxide, sulfone, heteroatoms, or a single bond.

17. The composition according to claim 1, wherein the thermal resistance-conferring component is a styryloxy compound within the following structure:

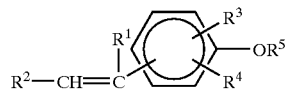
wherein $R^1$ and $R^2$ are H, or one of $R^1$ and $R^2$ is H and the other is alkyl; $R^3$ and $R^4$ which may be the same or different are H, $C_{1-5}$ alkyl or $C_{1-5}$ alkenyl; or one of $R^3$ and $R^4$ may be —$OR^5$ or $C_{1-5}$ alkoxy or $C_{1-5}$ alkenyloxy, if $R^2$ is not methyl; and $R^5$ is selected from
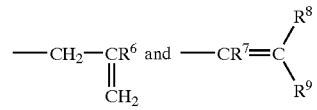
where $R^6$ is $C_{1-5}$ alkyl, and $R^7$, $R^8$ and $R^9$ may be the same or different and are H or $C_{1-5}$ alkyl.
\* \* \* \* \*